Oct. 19, 1937. E. C. MOODY 2,096,463
AUTOMATIC SLACK ADJUSTER
Filed June 13, 1936 2 Sheets-Sheet 1

INVENTOR
EDWIN C. MOODY.
BY *Wm. M. Cady*
ATTORNEY

Oct. 19, 1937.  E. C. MOODY  2,096,463
AUTOMATIC SLACK ADJUSTER
Filed June 13, 1936   2 Sheets-Sheet 2
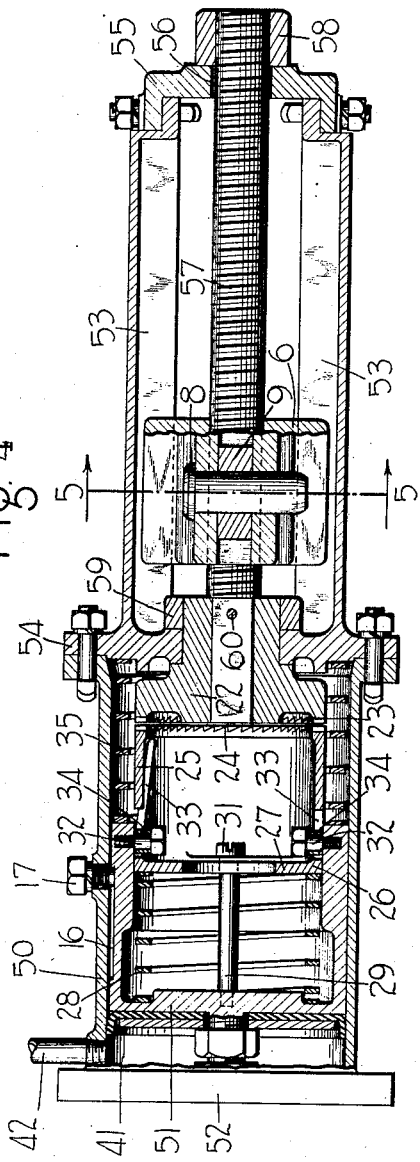
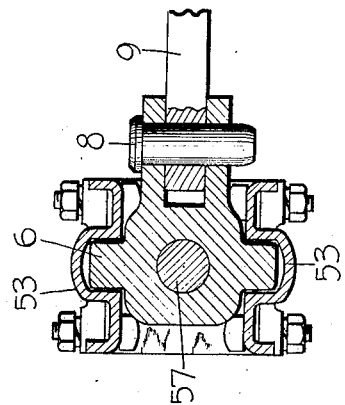
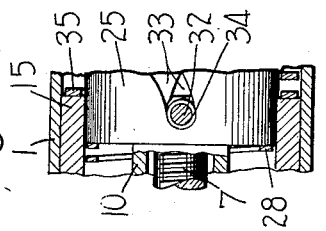
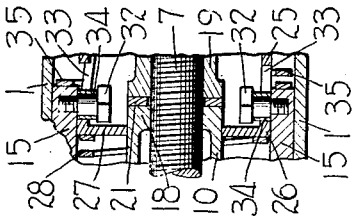
INVENTOR
EDWIN C. MOODY.
BY Wm. N. Cady
ATTORNEY Patented Oct. 19, 1937

2,096,463

UNITED STATES PATENT OFFICE 2,096,463

AUTOMATIC SLACK ADJUSTER

Edwin C. Moody, Wilmerding, Pa., assignor to The Westinghouse Air Brake Company, Wilmerding, Pa., a corporation of Pennsylvania Application June 13, 1936, Serial No. 85,007

15 Claims. (Cl. 188—203)

This invention relates to automatic slack adjusters for railway vehicle brakes and more particularly to that type of slack adjuster in which the slack take-up means and the motor for actuating the slack take-up means are coaxially arranged.

The principal object of the invention is to provide an improved slack adjuster of the above mentioned type.

Other objects and advantages will appear in the following more detailed description of the invention.

Figure 1:
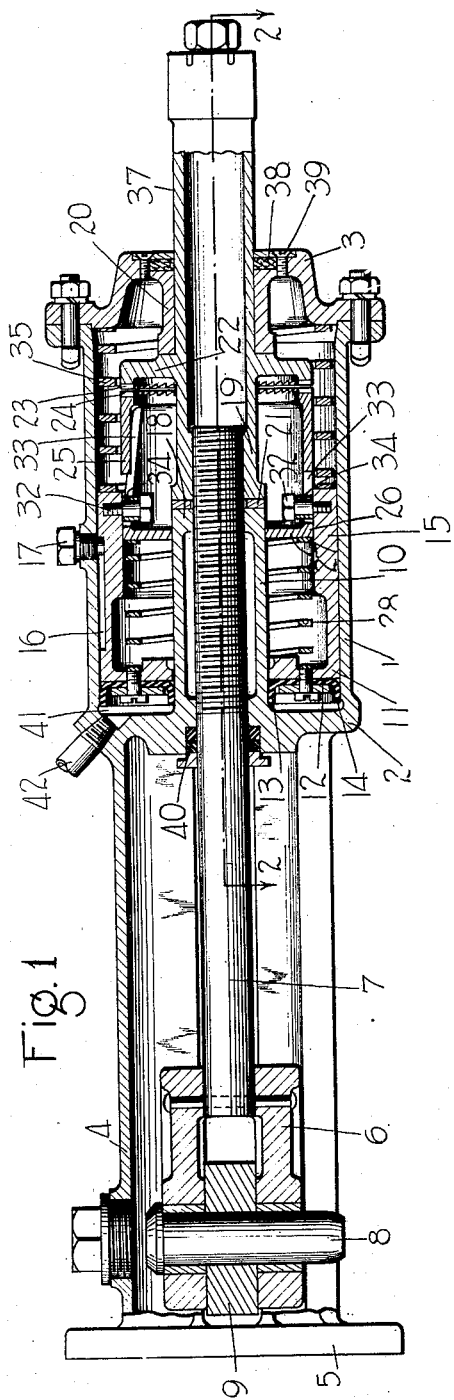
Figure 2:
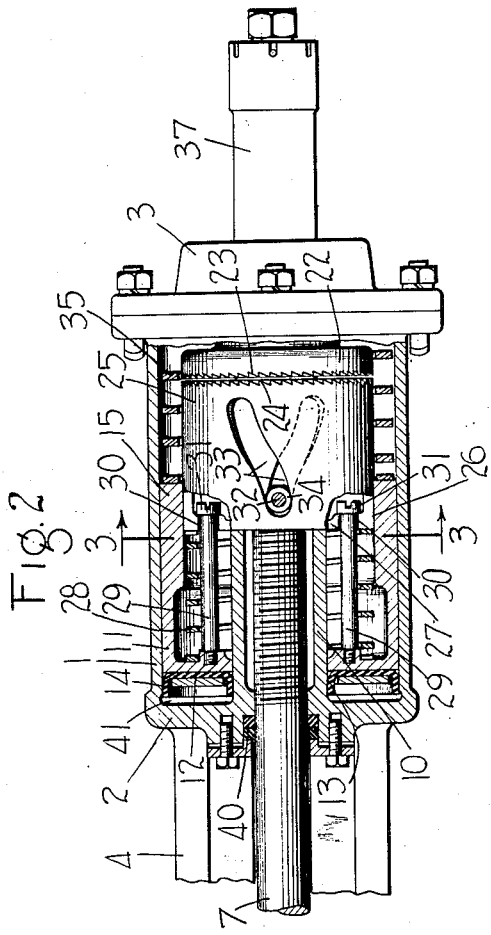
Figure 3:
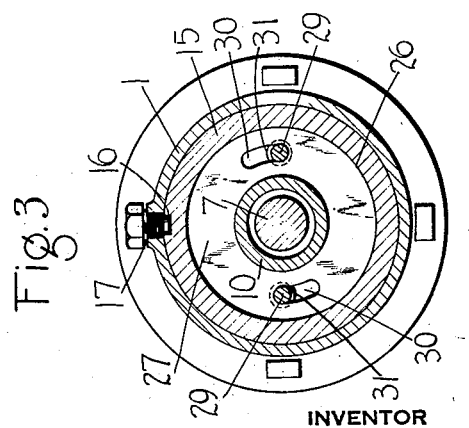

In the accompanying drawings, Fig. 1 is a longitudinal vertical sectional view of an automatic slack adjuster constructed in accordance with the invention; Fig. 2 is a fragmentary horizontal sectional view of the same taken on the line 2—2 of Fig. 1 and Fig. 3 is a cross-sectional view taken on the line 3—3 of Fig. 2. Fig. 4 is a longitudinal sectional view of another form of automatic slack adjuster constructed in accordance with the invention and Fig. 5 is a cross-sectional view of the same taken on the line 5—5 of Fig. 4. Figs. 6 and 7 are fragmentary vertical and horizontal sectional views of still another form of slack adjuster constructed in accordance with the invention.

As shown in Figs. 1, 2 and 3 of the drawings, the automatic slack adjuster may comprise a slack take-up cylinder 1 which, at one end, has an integral pressure head 2 and which, at the other end, has secured thereto a non-pressure head 3.

The casing also comprises a hollow guide portion 4 which extends outwardly from the pressure head 2. The outer end of this guide portion is in the form of an integral vertically disposed securing flange 5 which may be secured to any suitable supporting member of a car body or car truck or may be secured to the brake cylinder of a fluid pressure brake equipment. Contained in the guide portion and slidably guided thereby is a cross-head 6 which is secured to the outer end of a non-rotatable adjusting member or screw 7.

The cross-head 6 is operatively connected, by means of a pin 8, to a member 9 to be adjusted, which member may be a dead lever of a railway brake rigging.

Interiorly of the cylinder 1 of the casing an annular cylinder wall 10 is provided which is integrally connected at one end to the pressure head 2. This inner wall is of less diameter and of less length than the outer wall of the cylinder and is concentric therewith.

Contained in the space between the outer and inner walls of the cylinder 1 is a piston 11, which is annular in form and which surrounds and slidably contacts with the inner wall, which piston has secured to its pressure face an annular packing 12 having an inner annular skirt 13 which slidably engages the outer surface of the inner cylinder wall and also having an outer annular skirt 14 which slidably engages the inner surface of the outer cylinder wall.

The piston 11 is provided with an annular sleeve 15 which slidably contacts the inner surface of the outer wall of the cylinder. The sleeve 15 is provided with a narrow longitudinally extending exterior groove 16 for the reception of the inner end of a bolt 17 extending through and having screw-threaded connection with the outer wall of the cylinder 1. As shown in Fig. 3 this bolt prevents rotation of the piston relative to the cylinder and as shown in Fig. 1 serves as a stop for limiting movement in the direction toward the pressure head 2 so as to prevent the packing 12 from engaging and being damaged by the pressure head.

The inner end portion of the adjusting or slack take-up member 7 extends through a central opening in the pressure head 2 and an aligned opening in a bearing member 18 which is preferably integral with the inner annular wall of the cylinder. Beyond the member 18 the end of the adjusting member 7 has screw-threaded connection with rotatable slack take-up nut 19 which is journalled in an annular sleeve 20 which is integral with the non-pressure head 3, which sleeve also serves as a thrust bearing for preventing longitudinal movement of the nut in a direction toward the right hand. Longitudinal movement of the nut in the opposite direction is prevented by the engagement of the inner end of the nut with a thrust bearing plate 21 which abuts the bearing member 18.

The slack take-up nut 19 is provided with a circular clutch member 22 which is located within the cylinder 1 adjacent the inner end of the sleeve 20 of the non-pressure head 3 and which is provided with an inwardly directed annular flange having formed on its face ratchet clutch teeth 23. These teeth, as will hereinafter more fully appear, are adapted to be engaged by similar clutch teeth 24 formed on the end of the annular sleeve 25 of a clutch member 26 contained in the cylinder 1. The sleeve 25 is concentric with the cylinder 1 and extends longitudinally thereof into telescopic relation with the annular sleeve 15 of the piston 11. There is a slight operating clearance provided between the inner surface of the piston sleeve 15 and the clutch sleeve 25 to permit relative longitudinal movement between the sleeves and to permit rotary movement of the sleeve 25 relative to the piston sleeve 15. Integral with the telescoped end of the sleeve 25 is an annular spring seat 27 and interposed between and operatively engaging this spring seat and the inner face of the piston is a helical spring 28.

The inner edge of the spring seat 27 slidably engages the inner wall 18 of the cylinder 1 so that said wall serves to guide the clutch member 26 as it rotates and moves longitudinally of the cylinder. It will be understood from the foregoing description that the piston also serves to guide this clutch member.

Rigidly secured to the piston 11 and extending outwardly from the non-pressure face thereof are longitudinally disposed bolts 29 which pass through accommodating arcuate openings 30 provided in the spring seat 27 of the clutch member 26, the width of the openings being slightly greater than the diameter of the bolts to insure free longitudinal movement of the bolts relative to the clutch member. The free ends of the bolts are provided with heads 31 which are adapted to engage the inner surface of the spring seat 27 to move the clutch member 26 longitudinally in a direction toward the left hand as will hereinafter more fully appear and to maintain this clutch member out of engagement with the clutch member 22 of the slack take-up nut 19 as shown in Fig. 2.

The piston sleeve 15 adjacent its end has secured to its inner face, by means of screw threads, radially arranged inwardly extending laterally disposed headed shoulder bolts 32 which pass through longitudinally extending spiral slots 33 in the sleeve 25 of the clutch member 26, rollers 34 being mounted on the bolts for driving engagement with the edges of the slots.

Interposed between and operatively engaging the end of the piston sleeve 15 and an inner surface of the non-pressure head 3 is a heavy operating helical spring 35 which normally maintains the piston 11 in the position in which it is shown in Fig. 1.

The right hand end of the slack take-up nut 19 as shown is in the form of an annular sleeve 37 and extends beyond the outer surface of the non-pressure head 3. Surrounding and contacting the sleeve 37 and mounted in a recess formed in the outer face of the non-pressure head is a felt washer 38 which is clamped in place by an annular washer 39 secured to the non-pressure head by means of counter-sunk machine screws. This felt washer permits air to flow, by way of the necessary clearance space between the nut and the bearing sleeve 20 of the non-pressure head, to and from the chamber at the non-pressure side of the piston, and is adapted to cleanse the inflowing air of dirt and moisture.

Mounted in the pressure head 2 of the cylinder and surrounding and contacting the adjusting screw member 7 is a packing gland 40 which is adapted to prevent the entrance of air from the atmosphere to the chamber at the non-pressure side of the piston by way of the clearance space between the member 7 and the pressure head 2.

At the pressure side of the piston 11 is a chamber 41 which is connected to a pipe 42 through which fluid under pressure is adapted to be supplied to and released from the piston chamber 41. The pipe 42 is connected in the usual manner to the brake cylinder of a fluid pressure brake equipment, so that when the brakes are released the piston chamber 41 is vented to the atmosphere by way of the non-pressure chamber of the brake cylinder and when an application of the brakes is being effected and the brake cylinder piston moves far enough to uncover the pipe 42 to the brake cylinder piston chamber, fluid under pressure for actuating the slack take-up piston 11 flows to the piston chamber 41. This control of the supply and release of fluid under pressure to and from the slack take-up cylinder is so well known that it is deemed unnecessary to illustrate the brake cylinder or any other part of the fluid pressure brake equipment.

In operation when the brake shoes or other parts of the brake rigging become worn to such an extent that, in effecting an application of the brakes, the brake cylinder piston, not shown, moves outwardly a sufficient distance to uncover the pipe 42, fluid under pressure flows from the brake cylinder piston chamber through pipe 42 to the piston chamber 41 of the slack adjuster causing the piston 11 and thereby the piston sleeve 15 and bolts 29 to move outwardly in the direction toward the right hand, compressing the operating spring 35.

As the piston 11 begins to move under the influence of fluid pressure in chamber 41, the spring 28 acts to move the clutch member 26 forwardly with the piston causing the teeth 24 of the member to contact the teeth 23 of the clutch member 22 and by reason of such contact the forward movement of the clutch member 26 is stopped.

Now as the forward movement of piston 11 continues the heads 31 of the bolts 29 are moved out of engagement with the spring seat 27 of the clutch member 26 and the forwardly moving rollers 34 acting on the clutch sleeve 25 within the slots 33 cause the clutch member to be rotated a short distance in a counter-clockwise direction relative to the piston sleeve 15 and clutch member 22 in viewing the apparatus from the right hand end of Fig. 2, the teeth 24 of the member 26 ratcheting over the teeth 23 of the member 22. It will here be understood that when this rotary movement of the clutch member 26 occurs the brakes are applied so that the adjusting screw is subjected to a comparatively heavy force which increases the resistance of the nut to rotary movement to such an extent that rotary movement will not be transmitted from the clutch member 26 to the clutch member 22.

The piston 11 in its conditioning stroke will be brought to a stop by the engagement of the bolt 17 with the closed left hand end of the slot 16 in the piston sleeve 15.

When, in releasing the brakes, fluid under pressure is vented from the brake cylinder piston chamber, the brake cylinder piston is caused to move to its normal release position in the usual well known manner, the piston in its traverse first cutting off communication between the pipe 42 and the brake cylinder piston chamber and then establishing communication from the pipe 42 to the atmosphere by way of the non-pressure chamber of the brake cylinder, so that fluid under pressure is vented from the slack take-up piston chamber 41.

With the piston chamber 41 thus vented, the compressed spring 35 acts to return the piston 11 and thereby the piston sleeve 15, bolts 29, shoulder bolts 32 and rollers 34 to their normal position as shown in Figs. 1 and 2, and during their return movement are prevented from rotating by the engagement of the piston sleeve by the bolt 17. Since the piston sleeve and bolts 32 cannot rotate, the rollers acting in the slots 33 on the clutch sleeve 25 cause the clutch member 26 to rotate in a clockwise direction in viewing the apparatus from the right hand end of Fig. 2. When the clutch member is rotated in this direction, the teeth 24 engage the teeth 23 of the clutch member 22, so that the member 26 imparts rotary movement to the clutch member 22 and consequently to the nut 19, causing the adjusting member 7 to be moved in a direction toward the right hand and thereby effecting the take up of slack in the brake rigging.

It will here be understood that during the major portion of the adjusting stroke of the piston 11, the spring 28, which has been compressed by the piston, acts to maintain the clutch member 26 in driving engagement with the clutch member 22. However, as the piston is nearing the completion of its adjusting stroke, the heads of the bolts 29 engage the spring seat 27 of the clutch member 26 and as the piston completes its stroke the bolts move the clutch member 26 out of driving engagement with the clutch member 22 as shown in Figs. 1 and 2.

When worn brake shoes are to be replaced by new ones, it is necessary to move the cross-head 6 and adjusting member 7 in a direction toward the left hand to increase the slack in the rigging sufficiently to compensate for the greater thickness of the new shoes, and in order to do this the nut 19 is turned manually in a counterclockwise direction by means of a wrench or other suitable tool which may be applied to the sleeve portion 37 of the nut. If it should be desired to manually operate the slack adjusted to take up slack the nut 19 is turned in a clockwise direction. It will be noted that since the clutch members 22 and 26 are normally out of engagement with each other an operator may adjust the brakes by the single manual operation of turning the nut 19 as just described.

The automatic slack adjuster illustrated in Figs. 4 and 5 has substantially the same operating characteristics as the adjuster just described but there are several differences in the construction which will now be pointed out.

In this adjuster the cylinder 50 and piston 51 mounted therein are of circular form instead of annular and the pressure head of the cylinder is in the form of a flange 52 whereby the adjuster is adapted to be secured to any desired supporting structure. The cross-head 6 is slidably guided by spaced longitudinally extending guide members 53 which are integral with the non-pressure head 54 of the cylinder instead of being integral with the pressure head. Secured to the outer ends of the guide members 53 is a connecting member 55 which is provided with an opening 56 through which the outer end of a rotatable slack take-up screw 57 extends, the outer end of the screw having welded or otherwise secured thereto a collar 58 which is adapted to be engaged by a wrench or other suitable tool for manually rotating the screw.

The inner end of the slack take-up screw is secured to clutch member 22 so as to rotate therewith and between its ends has screw-threaded connection with the cross-head 6.

The clutch member 22 is in contact with the inner surface of the non-pressure head 54 of the cylinder so as to prevent longitudinal movement of the clutch member and screw 57 in the direction toward the right hand, longitudinal movement of these parts in the opposite direction being prevented by the engagement of a collar 59 with an outer surface of the non-pressure head, which collar is removably secured to the clutch member by means of a pin 60.

Aside from the differences above noted the slack adjuster is substantially the same as shown in Figs. 1, 2 and 3.

The operation of this slack adjuster is substantially the same as that of the adjuster illustrated in Figs. 1, 2 and 3 except that the clutch member 22 rotates the adjusting screw instead of an adjusting nut and that the screw is not movable longitudinally.

In Figs. 6 and 7 a modification is illustrated in which the bolts 29 are omitted and in which the shoulder bolts 32 act to move the clutch member 26 out of driving engagement with the clutch member 22 when the take-up piston nears the limit of its adjusting stroke. This construction may be employed in either of the slack adjusters shown.

While three illustrative embodiments of the invention have been described in detail, it is not my intention to limit its scope to these embodiments or otherwise than by the terms of the appended claims.

Having now described my invention, what I claim as new and desire to secure by Letters Patent, is:

1. In an automatic slack adjuster for railway brake rigging, in combination, a member rotatable to take up slack, rotatable means axially aligned with the member operative to actuate the member, a piston operative to actuate said means, and means carried by said piston operative as the piston nears the limit of its adjusting stroke for moving said means out of operative relation to said member.

2. In an automatic slack adjuster for railway brake rigging, in combination, a member rotatable to take up slack, rotatable means in axial alignment with the member operative to actuate the member, a piston operative to actuate said means, a resilient member for maintaining said means in operative engagement with said member as said means is being operated, and means carried by said piston and operated thereby for moving said means out of operative engagement with said member as the piston nears the limit of its adjusting stroke.

3. In an automatic slack adjuster for railway brake rigging, in combination, a member rotatable to take up slack, means operative to actuate said member, a piston operative to actuate said means, a resilient member interposed between and operatively engaging said piston and means for holding said means in operative engagement with said member when the piston is operated to actuate the means, and means carried by said piston and operated thereby for moving said means out of operative engagement with said member against the opposing action of said resilient member as the piston nears the limit of its adjusting stroke.

4. In an automatic slack adjuster for railway brake rigging, in combination, a slack take-up element rotatable to take up slack, a piston, means for preventing rotary movement of said piston, a member rotatably carried by said piston and operative thereby for actuating said element, and means carried by said piston adapted to move said member out of operative engagement with said element as the piston nears the limit of its adjusting stroke.

5. In an automatic slack adjuster for railway brake rigging, in combination, a slack take-up element rotatable to take up slack, a piston, means for preventing rotary movement of said piston, a member rotatably carried by said piston and operative thereby for actuating said element, means interposed between and operatively engaging said piston and member adapted to maintain said member in operative engagement with said element when the piston is operated to actuate said member, and means carried by said piston adapted to move said member out of engagement with said element as the piston nears the limit of its adjusting stroke.

6. In an automatic slack adjuster for railway brake rigging, in combination, a slack take-up element rotatable to take up slack, a piston, means for preventing rotary movement of said piston, a member rotatably carried by said piston and operative to actuate said element, means carried by said piston and operative thereby for imparting rotary movement to said member and thereby to said element, and means carried by said piston adapted to move said member out of operative engagement with said element as the piston approaches the end of its adjusting stroke.

7. In an automatic slack adjuster for railway brake rigging, in combination, a slack take-up element rotatable to take up slack, clutch means comprising a pair of rotatable clutch members for actuating said element, said clutch members being normally out of operative engagement with each other, a piston for actuating said clutch means, said piston having a conditioning stroke for moving one of said clutch members into operative engagement with the other and to condition the clutch means for taking up slack and having an adjusting stroke for actuating said clutch means to take up slack, and means cooperating with said piston and clutch means for effecting the separation of said clutch members as the piston nears the limit of its adjusting stroke.

8. In an automatic slack adjuster for railway brake rigging, in combination, a slack take-up element rotatable to take up slack, clutch means comprising a pair of rotatable clutch members for actuating said element, said clutch members being normally out of operative engagement with each other, a piston for actuating said clutch means, said piston having a conditioning stroke for moving one of said clutch members into operative engagement with the other and to condition the clutch means for taking up slack and having an adjusting stroke for actuating said clutch means to take up slack, yieldable means interposed between and operatively engaging the first mentioned clutch member and said piston and operative to maintain the clutch member in engagement with said other clutch member when the piston is being operated to actuate said clutch means, and means carried by said piston adapted to move the first mentioned clutch member out of engagement with said other clutch member as the piston nears the end of its adjusting stroke.

9. In an automatic slack adjuster for railway brake rigging, in combination, a casing comprising a cylinder, an element rotatably journalled in said casing for taking up slack, a pair of axially aligned interengaging clutch members contained in said cylinder operative to actuate said element, a piston in said cylinder operative for actuating said clutch members and thereby said element to take up slack, and means carried by said piston adapted to disengage said clutch members when the piston nears the end of its adjusting stroke.

10. In an automatic slack adjuster for railway brake rigging, in combination, a casing compris-
ing a cylinder, an element rotatably journalled in said casing for taking up slack, a pair of axially aligned clutch members contained in said cylinder for actuating said element, said clutch members being normally out of operative engagement with each other, a piston movable in one direction for moving one of said clutch members into contact with the other clutch member and for rotating the first mentioned clutch member in one direction, ratchet means for preventing such rotary movement from being transmitted to said other clutch member and for transmitting rotary movement to said other clutch member when the first mentioned clutch member is rotated in the opposite direction, said piston being movable in another direction for rotating the first mentioned clutch member in said opposite direction, and means operative as the piston nears the end of its travel in said other direction for moving the first mentioned clutch member out of operative engagement with said other clutch member.

11. In an automatic slack adjuster for railway brake rigging, in combination, a casing comprising a cylinder, an element rotatably journalled in said casing for taking up slack, a pair of axially aligned clutch members contained in said cylinder for actuating said element, said clutch members being normally out of operative engagement with each other, a piston movable in one direction for moving one of said clutch members into contact with the other clutch member and for rotating the first mentioned clutch member in one direction, ratchet means for preventing such rotary movement from being transmitted to said other clutch member and for transmitting rotary movement to said other clutch member when the first mentioned clutch member is rotated in the opposite direction, said piston being movable in another direction for rotating the first mentioned clutch member in said opposite direction, and resilient means for maintaining the first mentioned clutch member in engagement with said other clutch member as the first mentioned clutch member is being rotated in said opposite direction.

12. In an automatic slack adjuster for railway brake rigging, in combination, a casing comprising a cylinder, an element rotatably journalled in said casing for taking up slack, a pair of axially aligned rotatable clutch members contained in said cylinder for actuating said element, said clutch members being normally out of operative engagement with each other, a piston movable in one direction for moving one of said clutch members into contact with the other clutch member and for rotating the first mentioned clutch member in one direction, ratchet means for preventing such rotary movement from being transmitted to said other clutch member and for transmitting rotary movement to said other clutch member when the first mentioned clutch member is rotated in the opposite direction, said piston being movable in another direction for rotating the first mentioned clutch member in said opposite direction, resilient means for maintaining the first mentioned clutch member in engagement with said other clutch member as the first mentioned clutch member is being rotated in said opposite direction, and means carried by said piston operative to move the first mentioned clutch member out of engagement with said other clutch member as the piston nears the end of its travel in said other direction.

13. In an automatic slack adjuster for railway brake rigging, in combination, a casing comprising a cylinder, an element rotatably mounted in said casing for taking up slack, a piston operatively mounted in said cylinder, a member rotatably mounted in said piston adapted to be operated by said piston to actuate said element, said member being normally out of operative engagement with said element, means for moving said member into contact with said element upon movement of the piston in one direction, driving means on said piston cooperating with said member to impart rotary movement to said member upon movement of the piston in said direction, and means for preventing such rotary movement from being transmitted to said element and for transmitting rotary movement from the member to the element upon rotation of the member in the opposite direction, said driving means on said piston being adapted to impart rotary movement in said opposite direction to said member and thereby to said element upon movement of the piston in another direction.

14. In an automatic slack adjuster for railway brake rigging, in combination, a casing comprising a cylinder, an element rotatably mounted in said casing for taking up slack, a piston operatively mounted in said cylinder, a member rotatably mounted in said piston adapted to be operated by said piston to actuate said element, said member being normally out of operative engagement with said element, resilient means interposed between and engaging said piston and member for moving said member into contact with said element upon movement of the piston in one direction, driving means carried by said piston and cooperating with said member to impart rotary movement to the member upon movement of the piston in said direction, and ratchet means for preventing such rotary movement from being transmitted to said element, said ratchet means being operative for transmitting rotary movement from the member to the element upon rotation of the member in the opposite direction, said driving means on said piston being adapted to impart rotary movement in said opposite direction to said member and thereby to said element upon movement of the piston in the opposite direction.

15. In an automatic slack adjuster for railway brake rigging, in combination, a casing comprising a cylinder, an element rotatably mounted in said casing for taking up slack, a piston operatively mounted in said cylinder, a member rotatably mounted in said piston adapted to be operated by said piston to actuate said element, said member being normally out of operative engagement with said element, resilient means interposed between and engaging said piston and member for moving said member into contact with said element upon movement of the piston in one direction, driving means carried by said piston and cooperating with said member to impart rotary movement to the member upon movement of the piston in said direction ratchet means for preventing such rotary movement from being transmitted to said element, said ratchet means being operative for transmitting rotary movement from the member to the element upon rotation of the member in the opposite direction, said driving means on said piston being adapted to impart rotary movement in said opposite direction to said member and thereby to said element upon movement of the piston in the opposite direction, and means carried by said piston for moving said member out of operative engagement with said element when the piston nears the end of its stroke in said other direction.

EDWIN C. MOODY.